J. W. LEDOUX.
FLOW CONTROLLING MECHANISM.
APPLICATION FILED FEB. 4, 1909.

993,384.

Patented May 30, 1911.

2 SHEETS—SHEET 1.

WITNESSES:

INVENTOR
John W. Ledoux.
BY
Charles N. Butler
ATTORNEY.

J. W. LEDOUX.
FLOW CONTROLLING MECHANISM.
APPLICATION FILED FEB. 4, 1909.

993,384.

Patented May 30, 1911.

2 SHEETS—SHEET 2.

UNITED STATES PATENT OFFICE.

JOHN W. LEDOUX, OF SWARTHMORE, PENNSYLVANIA.

FLOW-CONTROLLING MECHANISM.

993,384.  Specification of Letters Patent.  Patented May 30, 1911.

Application filed February 4, 1909. Serial No. 475,974.

*To all whom it may concern:*

Be it known that I, JOHN W. LEDOUX, a citizen of the United States, residing at Swarthmore, in the county of Delaware and State of Pennsylvania, have invented certain Improvements in Flow-Controlling Mechanism, of which the following is a specification.

My invention is an improved flow controlling mechanism wherein a valve is automatically operated, to regulate the flow through a conduit, by differential pressures which are functions of the rate of flow through the conduit.

The characteristics of my improvements are disclosed in the following description and the accompanying drawings in illustration thereof.

Figure 1:
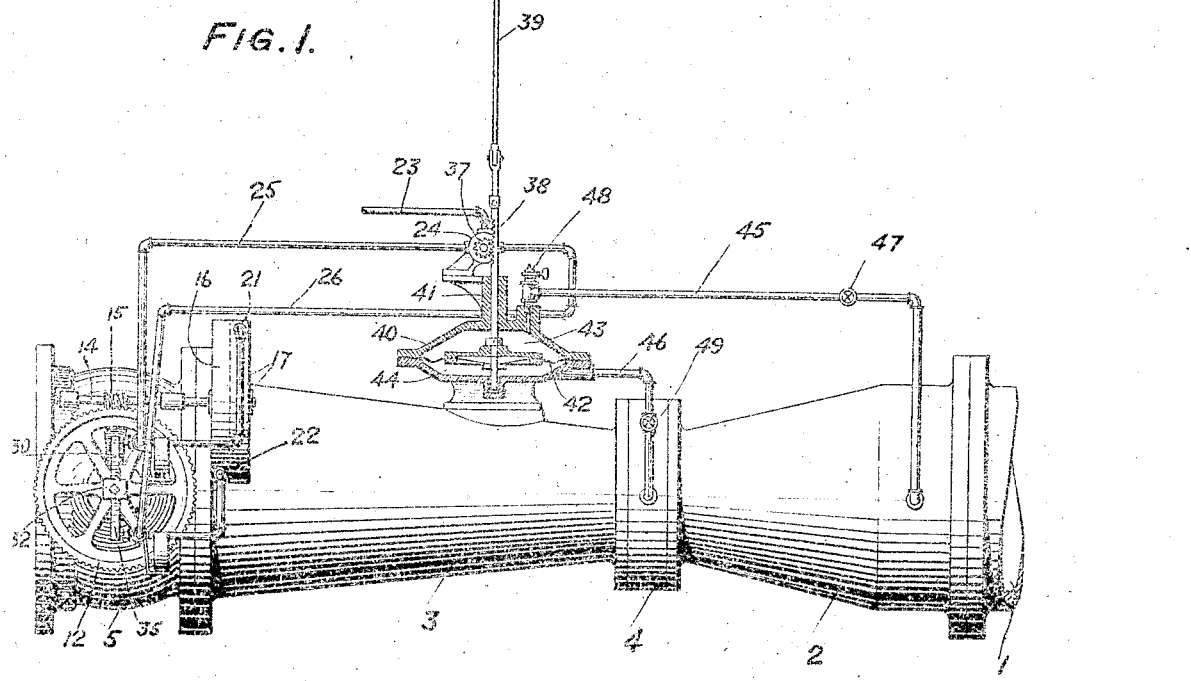
Figure 2:
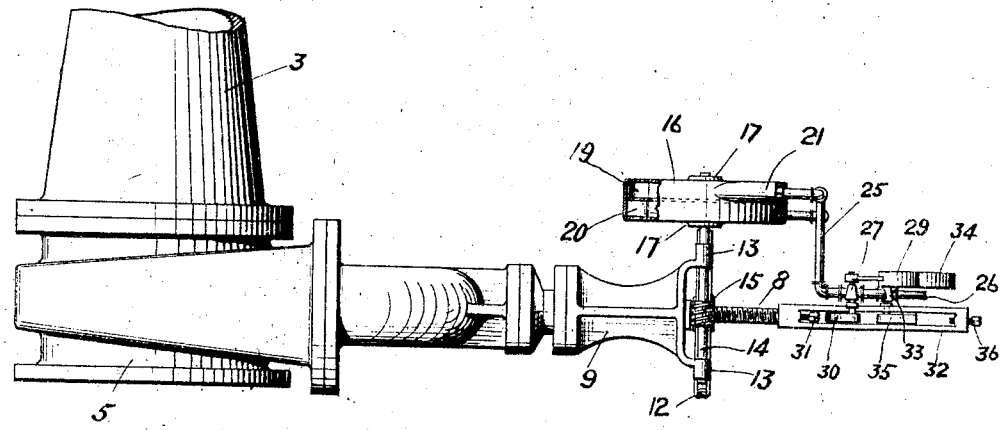
Figure 3:
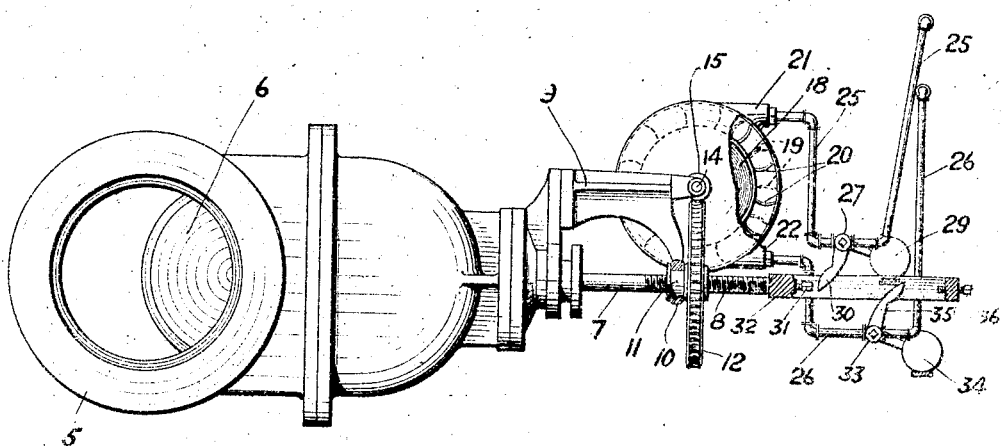

In the drawings, Figure 1 is a sectional elevation of apparatus embodying my improvements; Fig. 2 is a top plan view of part of the apparatus shown in Fig. 1; and Fig. 3 is a side elevation of the mechanism shown in Fig. 2.

The apparatus represented in the drawings comprises the conduit 1 having the sections 2 and 3 tapering to the throat 4 and forming a Venturi section. A valve casing 5 is placed in the conduit and a gate valve 6 is moved therein by a stem 7 having a screw thread 8. A bracket 9 on the valve casing 5 has journaled in the bearing 10 thereof the hub 11 of a worm wheel 12, the hub engaging the threaded section of the stem which it is adapted to move longitudinally. The bracket 9 has the bearings 13 in which is journaled a shaft 14 provided with a worm 15 engaging the worm wheel 12 to revolve it.

A casing 16 has thereon the bearings 17 in which the shaft 14 is journaled and fixed on the shaft within the casing is a wheel 18 provided with the vanes 19 and 20, the casing having thereon the nozzles 21 and 22 for communicating fluid pressure to the respective sets of vanes. A fluid pressure pipe 23 is connected by a valve 24 with pipes 25 and 26 which are connected with the respective nozzles 21 and 22.

The pipe 25 contains a rotary valve 27, which is normally opened by a weight 29 and closed by an arm 30, both secured to the stem thereof. The arm 30 is operated, to effect the gradual closure of the valve 27 as the valve 6 approaches the maximum opening desired, by a screw 31 which is adjustable in a yoke 32 fixed to the stem 7. The gradual closing of the valve 27 gradually reduces the fluid impact upon the vane wheel, regardless of the position of the valve 24, whereby shock is avoided to the apparatus on the stopping of the valve 6 at the limit of its opening movement.

The pipe 26 contains a rotary valve 33 which is normally held in the open position by a weight 34 and closed by an arm 35, both fixed to the valve stem thereof. The arm 35 is actuated, to cause the gradual closure of the valve 33 as the valve 6 approaches the limit of its closing movement, by a set screw 36 adjustable in the yoke 32, hence the impact on the vane wheel is gradually reduced as the valve 6 approaches the closed position and the apparatus is brought to rest gradually independently of the position of the valve 24.

The valve 24 is operated by a pinion 37 on the stem thereof which is engaged by a reciprocating rack 38 carried by a rod 39. The lower end of the rod 39 extends into the diaphragm casing 40 through the way 41 thereof and is fixed to the diaphragm 42 which forms with the casing the chambers 43 and 44. The chamber 43 is connected by a pipe 45 with a normal section of the conduit 1 and the chamber 44 is connected by a pipe 46 with the throat 4 of the Venturi section 1, the pipe 45 containing valves 47 and 48 and the pipe 46 the valve 49 for regulating purposes. The rod 39 is connected with the short arm of a scale beam 50 fulcrumed on the bearing 51 and having on the long arm thereof the adjustable poise 52, by which the rod and mechanism carried thereby are counterbalanced, and the resultant pressure required for moving the diaphragm 42 and throwing the valve 24 can be regulated.

When there is no flow in the conduit 1, equal pressures are communicated from the normal and contracted sections thereof through the respective ducts 45 and 46 to the respective pressure chambers 43 and 44, the diaphragm 42 is held in its highest position by the action of the counter poise 52 through the beam 50 and the rod 39, and the valve 24 is held in position to close the duct 25 and open the duct 26 through the action of the rack 38 and pinion 37. With the duct 25 closed and the duct 26 open, pressure is communicated through the latter, from the duct 23, to the vanes 20 of the wheel 18 and the wheel acts through the worm shaft 14, worm wheel 12 and threaded stem 7 to hold open the valve 6.

When the flow in the conduit 1 reaches a predetermined rate, so that the pressure communicated through the duct 45 is enough greater than the pressure communicated through the duct 46 to move the diaphragm against the action of the counterbalance mechanism, the downward movement of the rod 39 causes the rack 38 and pinion 37 to throw the valve 24 so that pressure from the duct 23 to the duct 26 is cut off and pressure is communicated through the duct 25 to the vanes 19 of the wheel 18, which acts through the worm shaft 14, worm wheel 12 and threaded stem 7 to close the valve 6.

It will be understood that by the foregoing actions the flow through the conduit is automatically regulated, and that by adjusting the poise the resultant pressure or rate of flow required to move the diaphragm and the auxiliary valve operated thereby may be varied. The valve in the main conduit being fully open when the flow is at the minimum rate and the diaphragm being moved to operate the auxiliary valve when a certain predetermined rate is attained, it will be seen that the positions of the auxiliary valve and the flow through the respective ducts controlled thereby will be functions of the normal flow through the conduit. As the movement of the vane wheel is effected by the resultant pressure communicated thereto by way of the ducts, when the pressures communicated or rates of flow through these ducts are equal the wheel will be in a state of equilibrium and the main valve will be held in position to permit the desired rate of flow through the conduit.

Having described my invention, I claim:

1. In combination with a conduit having a contracted section, a valve for controlling the flow through said conduit, a wheel having two sets of vanes whereby it is revoluble in reverse directions, means whereby said wheel operates said valve, ducts for projecting fluid against the respective sets of vanes, valve mechanism for controlling the flow through said ducts, a pressure chamber, a diaphragm in said chamber, means for carrying pressure from said contracted section of said conduit and a different section of said conduit to said pressure chamber on opposite sides of said diaphragm, and means whereby said diaphragm regulates the position of said valve mechanism.

2. In combination with a conduit, a valve for controlling the flow through said conduit, a vane wheel, means whereby said vane wheel operates said valve, a duct for carrying fluid to said vane wheel, a valve in said duct, and means whereby said valve first named as it approaches a limit of its movement gradually closes said valve last named.

3. In combination with a conduit, a valve for controlling said conduit, a stem for operating said valve, a vane wheel, means whereby said vane wheel operates said stem, ducts for conveying fluid pressures to said wheel, valves for controlling said ducts, and means carried by said stem for operating said duct valves alternately as said conduit valve approaches the respective limits of its movements.

4. In combination with a conduit, a valve for controlling said conduit, a stem for operating said valve, a vane wheel, means whereby said vane wheel operates said stem, ducts for discharging fluid against the vanes of said wheel to revolve it in opposite directions, a valve for controlling each of said ducts, automatic means for holding said valves in their normal positions, and means operated by said stem for moving said valves alternately from said normal positions.

In witness whereof I have hereunto set my name this 3rd day of February, 1909, in the presence of the subscribing witnesses.

JOHN W. LEDOUX.

Witnesses:
W. H. ROTH,
C. N. BUTLER.